United States Patent [11] 3,549,914

| [72] | Inventors | Malcolm S. Jones, Jr.<br>Corona Del Mar, Calif.;<br>William J. Conner, Tonawanda, N.Y. |
|---|---|---|
| [21] | Appl. No. | 742,269 |
| [22] | Filed | July 3, 1968 |
| [45] | Patented | Dec. 22, 1970 |
| [73] | Assignee | Aerojet-General Corporation<br>El Monte, Calif.<br>a corporation of Ohio |

[54] MONOLITHIC ELECTRODES FOR MHD GENERATORS
18 Claims, 9 Drawing Figs.

[52] U.S. Cl. .................................................. 310/11
[51] Int. Cl. .................................................. H02n 4/02
[50] Field of Search .......................................... 310/11,
253; 204/294; 23/209.1P

[56] References Cited
UNITED STATES PATENTS

| 3,114,062 | 12/1963 | Fay | 310/253 |
| 3,233,127 | 2/1966 | McKechnie | 310/11 |

Primary Examiner—David X. Sliney
Attorneys—Edward O. Ansell and D. Gordon Angus

ABSTRACT: According to the present disclosure, an electrode for a magnetohydrodynamic (MHD) generator comprises a body of anisotropic material having a substantially higher electrical resistivity along one axis than along another.

The electrode is oriented with an MHD generator by aligning the axis of high resistivity with the direction of load current of the generator. In this manner, currents utilized for sustaining an electric field are permitted to flow, and short circuiting of the output is prevented.

PATENTED DEC 22 1970

3,549,914

INVENTORS:
MALCOLM S. JONES, JR.,
WILLIAM J. CONNER
BY
J. Gordon Angus
ATTORNEY.

MONOLITHIC ELECTRODES FOR MHD GENERATORS

This invention relates to magnetohydrodynamic electrical generators (sometimes hereinafter abbreviated "MHD generators").

MHD generators produce electrical power by moving electrically conductive fluids relative to a magnetic and electrical field. The electrically conductive fluid is generally a conductive gas produced by a high temperature, high pressure source. The fluid (sometimes hereinafter called "plasma") moves through the generator and induces an electromotive force (e.m.f.) between electrodes within the generator.

Basically, there are two types of MHD generators, one class being the Faraday generators and the other being the Hall generators. In the Faraday generators, the external load is placed across the generator so that the load current flows predominantly in a direction normal to the axial flow of gas, while in the Hall generators the external load is connected so that the load current flows predominantly in a path which is parallel to the axial flow of gas.

In the Hall generators the external circuit connections are made at the inlet and exit of the MHD generator channel so that the voltage generated along the length of the channel is connected to the output load. With this circuit arrangement, the channel walls of the generator can be approximated to an electrical resistor in parallel with the load. If the electrical resistance of the channel walls is low, the walls will act as a shunt or short circuit across the load, thereby resulting in little current or voltage delivered to the load. Thus, in the case of Hall generators, the channel walls must have a relatively high resistance along the length of the generator so that the overall axial resistance of the wall is sufficiently high. On the other hand, to maintain the Hall electric field within the generator, circulating currents must flow normal to the gas flow within the channel. The circulating current is conducted through the channel walls which present a relatively low resistance in the plane normal to the axial flow of gas.

Heretofore, the conflicting wall resistance requirements for Hall generators have been met by utilizing a segmented wall construction consisting of alternate segments of high resistance insulator material and low resistance electrode material along the length of the channel. By utilizing segmented electrodes separated by insulative material, the requirements for high resistance along the length of the wall and low resistance normal to the axis may be achieved.

Similarly in Faraday generators, the output is taken from electrodes which are placed across the generator channel so that the load current flows normal to the axis. In this case, the wall construction must provide a relatively high resistance normal to the axis. Thus, in prior Faraday generators, the wall construction has been segmented to provide high resistance normal to the flow of gas.

Although the segmented wall construction works well for MHD generators, such construction is difficult to manufacture because it requires the fabrication of separate electrode and insulator segments and the assembly of the segments to form the generator channel. Furthermore, gaps between adjacent electrode and insulator segments can cause leakage of plasma and can cause concentration of electric fields at the gaps, which can result in undesirable effects and loss of efficiency.

An object of the present invention is to provide a continuous electrode for an MHD generator.

Another object of the present invention is to provide a continuous wall construction for an MHD generator having relatively high conductance in one direction and relatively high resistance in another direction.

Another object of the present invention is to provide a continuous electrode for an MHD generator which permits the establishment of an appreciable electric field along the surface of the electrode in a selected direction.

An electrode according to the present invention is constructed of a material having an electrical conductivity which varies with the plane of orientation. In accordance with the present invention, an electrode is constructed of anisotropic material, such as pyrolitic graphite, to obtain high resistivity along one axis and low resistivity along another axis.

Among the advantages of the present invention, the channel wall of an MHD generator may be constructed from a single workpiece of anisotropic material. For large generators, the channel wall may be constructed from a plurality of similar modules which may be assembled together. Thus, the same techniques may be utilized for construction of large generators as are used for construction of microgenerators.

The above and other features of this invention will be more fully understood from the following detailed description and the accompanying drawings, in which:

FIGS. 1—4 are illustrations of typical prior art MHD generators, FIG. 1 being a section view of a typical Hall generator, FIG. 2 being a side view partly in cutaway cross section of a typical Hall generator, FIG. 3 being a side view in cutaway cross section of a typical Faraday generator, and FIG. 4 being a section view taken at line 4—4 in FIG. 3;

Figure 1:
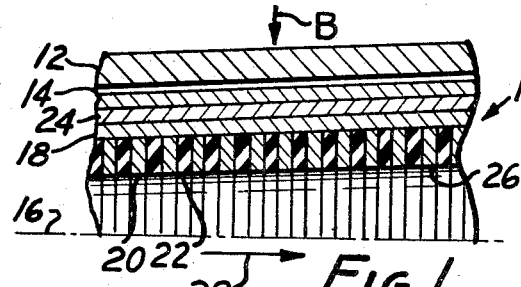
Figure 2:
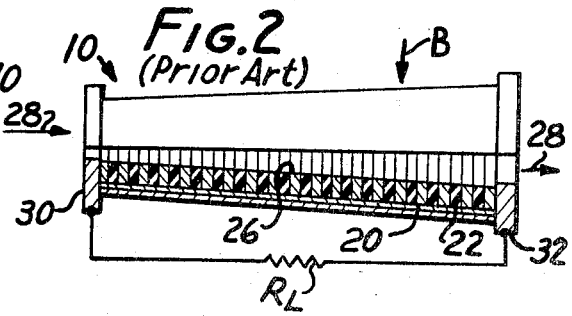

Referring to the drawings, there is illustrated in FIGS. 1 and 2 a typical Hall-mode magnetohydrodynamic (MHD) generator 10. Generator 10 includes an outside shell 12 having a coolant passage 14 adapted to pass coolant through shell 12 substantially parallel to the flow of plasma along axis 16. An inner shell 18 supports a plurality of segmented electrodes 20 separated by insulators 22. Typically, an insulator layer 24 is sandwiched between shell 18 and shell 12. The stack of alternate insulators and electrodes forms an inner surface 26 of the generator channel. Preferably, the channel is flared or conical so that the flow of plasma in the direction indicated by arrow 28 is toward the enlarged portion of the channel and the pressure of the plasma at the exhaust end is lower than the pressure at the entrance end.

As illustrated in FIG. 2, terminal devices 30 and 32 are connected to each end of the Hall generator and are in electrical contact with the end electrodes thereof. A load resistance $R_L$ may be connected across the terminal devices 30 and 32. A magnetic field is generated by means (not shown) in the direction of arrow B, normal to axis 16 of the generator. By way of example, a permanent magnet or an electromagnet may be positioned adjacent the generator to create the magnetic field.

In operation, plasma enters the chamber at the inlet opening and flows through the chamber toward the exit opening. Typically, the plasma is a high temperature, conductive gas. A plasma generator (not shown) is in fluid communication with the inlet opening of the MHD generator and produces the plasma and directs it at sufficient velocity to the MHD generator. Since most gases do not exhibit a degree of conductivity of a magnitude desirable for operation of the MHD generator, the plasma generator usually includes a seeding device (not shown) which injects an ionizing material into the gas stream. Typical ionizing materials are cesium carbonate or potassium carbonate. By way of example, nitrogen gas at a temperature of 7700°R., seeded with approximately 2 percent powdered potassium carbonate has been found to provide a suitable plasma.

The magnetic field within the MHD generator operates on the conductive plasma passing therethrough and provides a force on the charged particles within the plasma. The force provided by the magnetic field tends to deflect the electrons in the plasma from the flow path of the plasma stream. Since the mass of the protons is substantially greater than that of the electrons, the protons and other positively charged particles are not deflected from the plasma stream by a significant amount. The deflected electrons induce a current in the segmented electrodes forming the MHD generator channel. The current induced in the electrodes, sometimes called the "Hall current," circumferentially flows about the axis of the channel in each electrode and generates an electric field axially within the channel to induce a charge in the electrodes.

It can be shown that each successive segmented electrode is induced with a greater negative charge from the deflected electrons than the preceding electrodes. Thus, a voltage is created between successive electrodes which, when measured between the end electrodes of the MHD generator, represents the voltage output of the generator.

From the foregoing it can be understood that the electrode configuration of the Hall mode MHD generator must provide high conductivity circumferentially about the axis of the generator to permit the flow of Hall currents while, at the same time, providing a high resistance along the axis of the generator to prevent short circuiting of the output terminals.

Figure 3:
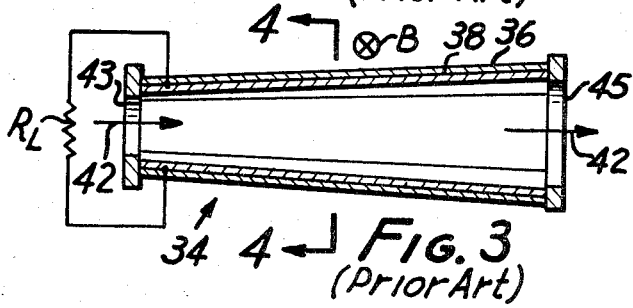
Figure 4:
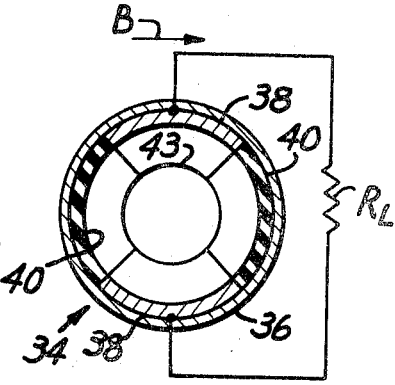

FIGS. 3 and 4 illustrate a typical Faraday magnetohydrodynamic generator 34 comprising a shell 36 enclosing a plurality of longitudinally disposed electrodes 38 and insulators 40. A magnetic field is generated by means (not shown) in the direction of arrow B, and load resistances $R_L$ are connected to oppositely disposed electrodes 38. As conductive plasma moves in the direction of arrows 42 from inlet 43 to outlet 45 through the channel formed by axially disposed electrodes and insulators, electric fields are induced in the plasma to generate a voltage between the oppositely disposed electrodes.

The present invention relates to an electrode constructed from an anisotropic material having a resistivity in one plane of orientation which is greater than the resistivity in another plane of orientation. Preferably, the anisotropic material is monolithic so that the entire inner shell of the chamber may be constructed of the same material. One example of suitable anisotropic material is pyrolytic graphite.

Figure 5:
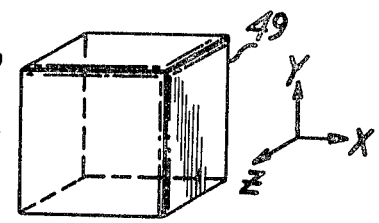
FIG. 5 is a representation of the principles of operation of an electrode according to the present invention.

FIG. 5 is a diagrammatic illustration of a cube 49 of anisotropic material having three mutually perpendicular axes of orientation, x, y, and z. Preferably, the resistivity of the material is substantially greater along one axis of orientation than along either of the other two axes of orientation. Thus, $$\frac{Pz}{Px} \gg 1, \text{ and } \frac{Pz}{Py} \gg 1 \text{, where Px Py and Pz}$$

are the resistivities along the respective x, y and z axes.

Examples of suitable anisotropic materials are pyrolytic graphite and pyrolytic boron nitride. Pyrolytic graphite is particularly useful in the practice of this invention because of its thermal conductivity, resistivity orientation and ability to withstand temperatures in the operating range of the MHD generator. By way of example, pyrolytic graphite has a resistivity along one axis of orientation on the order of 1,700 times the resistivity along the other axes of orientation at a temperature of about 3,000° F. The thermal conductivity of pyrolytic graphite is adequate to permit substantial changes in environmental temperature without serious differential thermal expansion. Thus, the likelihood of thermal stresses developing with the material is substantially eliminated.

Figure 6:
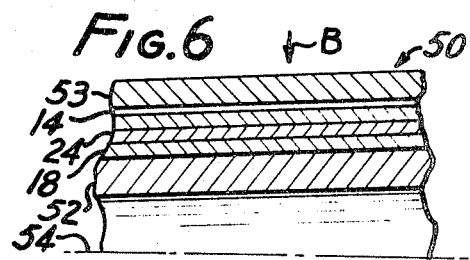
FIG. 6 is a section view of a portion of an MHD generator according to the presently preferred embodiment of the present invention.

In FIG. 6 there is illustrated an electrode configuration according to the presently preferred embodiment of the present invention. In FIG. 6, an MHD generator 50 is illustrated having a continuous monolithic electrode 52 and an outer shell 53. If desired, a nonconductive supporting shell 18 may be provided for supporting electrode 52. Likewise, an insulator material 24 may be sandwiched between shell 18 and shell 53. A cooling passage 14 may be provided in shell 53 to admit coolant through the passage from means (not shown) to cool the wall of the generator. By way of example, shell 18 may be constructed of a suitable zirconia insulation. It is to be understood that the provision of the additional shells 18 and 53 and insulator material 24 is not necessary to the practice of this invention and may, if desired, be eliminated.

Electrode 52 is constructed of a suitable anisotropic material, such as pyrolytic graphite. The axis of highest resistivity is oriented parallel to axis 54 of the MHD generator, in the case of a Hall-mode generator, or perpendicular to axis 54 in the case of a Faraday generator. In either case, the anisotropic material is oriented so that the axis displaying the highest resistivity is perpendicular to the magnetic field indicated by arrow B.

Figure 7:
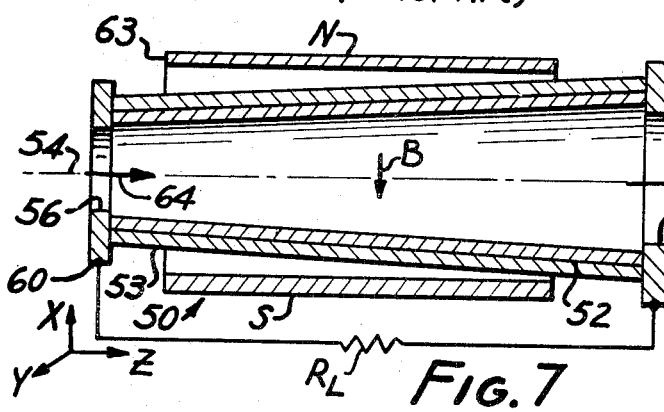
FIGS. 7 and 8 are side view elevations in cutaway cross section of a Hall generator and a Faraday generator, respectively, according to the present invention.

In FIG. 7 there is illustrated a Hall generator 50 according to the present invention. The generator includes an inner body 52 constructed of anisotropic material, such as pyrolytic graphite. The axis of orientation of the anisotropic material is such that the highest resistivity is substantially parallel to axis 54 of the generator. Plasma enters the chamber formed by body 52 through an entrance opening 56 and flows axially through the chamber and exits through exit opening 58. Terminals 60 and 62 are electrically connected to electrode 52 adjacent the entrance and exit openings and provide electrical connections for load $R_L$. It is to be understood that several terminals for connection to several load resistances may be incorporated with the electrode. Magnet 63, having north and south poles, N and S, respectively, is oriented perpendicular to axis 54 to generate a magnetic field in the direction indicated by arrow B.

In operation of the Hall mode MHD generator illustrated in FIG. 7, the conductive plasma moves along the direction indicated by arrow 64. The magnetic field operates on the plasma to generate a Hall current within body 52 of the generator as hereinbefore described. Since the x and y axes of the material are perpendicular to axis 54 of the generator, body 52 exhibits relatively low resistivity in a plane normal to axis 54 and currents are free to flow within shell 52 circumferentially about axis 54. However, due to the high resistivity of body 52 along its axis parallel to axis 54, current is impeded from flowing through the body along axis 54 of the generator. Thus, the Hall currents are free to flow about axis 54 to induce an electric field into the chamber, and a short circuit is prevented between terminals 60 and 62 along axis 54.

Figure 8:
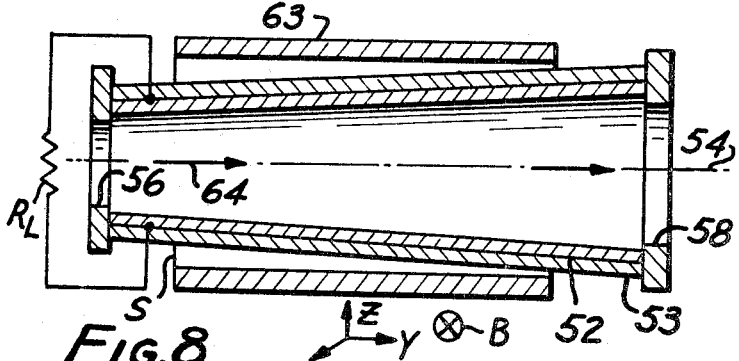

FIG. 8 illustrates a Faraday MHD generator according to the present invention wherein inner body 52 is oriented so that the z-axis of the anisotropic material is normal to axis 54 of the generator and to the direction of the magnetic field indicated by arrow B (into the plane of the drawing). The magnetic field is generated by magnet 63. In this case, the load is connected to inner shell 52 of the generator on opposite sides of the generator in line with the z-axis of the material. As plasma flows through the channel in the direction of arrow 64, an electrical charge is induced into body 52 to generate an electrical power output to the load.

In each case, the load is connected to the anisotropic material along a line oriented with the z-axis, the axis of orientation of highest resistivity. In each case, the currents necessary for sustaining the electric field within the generator are maintained, and short circuiting across the load is prevented.

Figure 9:
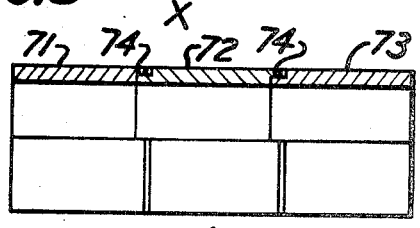
FIG. 9 is a side view elevation, partly in cutaway cross section, of a plurality of assembled electrodes forming an MHD generator in accordance with the present invention.

The present invention thus provides an electrode construction for an MHD generator which is easily manufactured and assembled to the generator. If desired, the electrodes may be made in modules which may be assembled together to form an electrode for a generator. Thus, as illustrated in FIG. 9, electrode 70 comprises a plurality of sections 71, 72 and 73. The sections 71—73 are assembled by overlapping their respective lips 74.

The present invention thus provides a monolithic electrode construction for an MHD generator, which electrode is easily constructed and assembled. The electrode is effective to provide substantially high resistivity across the output, while at the same time providing high conductivity to the induced currents for sustaining an electric field.

This invention is not to be limited by the embodiments shown in the drawings and described in the description, which are given by way of example and not of limitation, but only in accordance with the scope of the appended claims.

We claim:

1. An electrode for a magnetohydrodynamic generator comprising a body defining a channel for passing conductive plasma along a channel axis, said body being of anisotropic, homogeneous material continuous between the ends of said channel, said material having substantially higher electrical resistivity along a first axis than along another axis.

2. An electrode according to claim 1 wherein the material has a resistivity along said first axis which is substantially higher than the resistivity along either of the two other axes, each of the three axes being mutually perpendicular.

3. An electrode according to claim 1 wherein $\frac{Pz}{Px} \gg 1$, and $\frac{Pz}{Py} \gg 1$, where Pz is the resistivity along said first axis, Px is the resistivity along a second axis, and Py is the resistivity along a third axis, said first, second and third axes being mutually perpendicular.

4. An electrode according to claim 1 wherein said material is pyrolytic graphite.

5. An electrode according to claim 4 wherein the material has a resistivity along said first axis which is substantially higher than the resistivity along either of two other axes, each of the three axes being mutually perpendicular.

6. An electrode according to claim 4 wherein $\frac{Pz}{Px} \gg 1$, and $\frac{Pz}{Py} \gg 1$, where Pz is the resistivity along said first axis, Px is the resistivity along a second axis, and Py is the resistivity along a third axis, said first, second and third axes being mutually perpendicular.

7. A magnetohydrodynamic generator comprising: a channel for passing conductive plasma along a channel axis; means for producing a magnetic field in said channel substantially perpendicular to said channel axis; a homogeneous wall of anisotropic material continuous between points adjacent the ends of the generator channel, said wall defining said channel, said material having a substantially higher electrical resistivity along a first axis than along another axis; and electrical output means connected to said wall at locations along said first axis.

8. Apparatus according to claim 7 wherein said generator is a Hall generator and said first axis is substantially parallel to said channel axis.

9. Apparatus according to claim 8 wherein the material has a resistivity along said first axis which is substantially higher than the resistivity along either of two other axes, each of the three axes being mutually perpendicular.

10. Apparatus according to claim 8 wherein $\frac{Pz}{Px} \gg 1$, and $\frac{Pz}{Py} \gg 1$, where Pz is the resistivity along said first axis, Px is the resistivity along a second axis, and Py is the resistivity along a third axis, said first, second and third axes being mutually perpendicular.

11. Apparatus according to claim 7 wherein said generator is a Faraday generator and said first axis is substantially perpendicular to said channel axis and to the direction of said magnetic field.

12. Apparatus according to claim 11 wherein the material has a resistivity along said first axis which is substantially higher than the resistivity along either of two other axes, each of the three axes being mutually perpendicular.

13. Apparatus according to claim 11 wherein $\frac{Pz}{Px} \gg 1$, and $\frac{Pz}{Py} \gg 1$, where Pz is the resistivity along said first axis, Px is the resistivity along a second axis, and Py is the resistivity along a third axis, said first, second and third axes being mutually perpendicular.

14. Apparatus according to claim 7 wherein the material has a resistivity along said first axis which is substantially higher than the resistivity along either of two other axes, each of the three axes being mutually perpendicular.

15. Apparatus according to claim 7 wherein $\frac{Pz}{Px} \gg 1$, and $\frac{Pz}{Py} \gg 1$, where Pz is the resistivity along said first axis, Px is the resistivity along a second axis, and Py is the resistivity along a third axis, said first, second and third axes being mutually perpendicular.

16. Apparatus according to claim 7 wherein said material is pyrolytic graphite.

17. Apparatus according to claim 16 wherein the material has a resistivity along said first axis which is substantially higher than the resistivity along either of two other axes, each of the three axes being mutually perpendicular.

18. Apparatus according to claim 16 wherein $\frac{Pz}{Px} \gg 1$, and $\frac{Pz}{Py} \gg 1$, where Pz is the resistivity along said first axis, Px is the resistivity along a second axis, and Py is the resistivity along a third axis, said first, second and third axes being mutually perpendicular.